US007788146B2

(12) United States Patent
McCarthy, Jr.

(10) Patent No.: US 7,788,146 B2
(45) Date of Patent: Aug. 31, 2010

(54) SYSTEM FOR VISUALIZING FINANCIAL DATA

(75) Inventor: Michael J. McCarthy, Jr., San Diego, CA (US)

(73) Assignee: CFO Technology Corporation, San Diego, CA (US)

( * ) Notice: Subject to any disclaimer, the term of this patent is extended or adjusted under 35 U.S.C. 154(b) by 1083 days.

(21) Appl. No.: 10/971,496

(22) Filed: Oct. 22, 2004

(65) Prior Publication Data

US 2006/0089889 A1    Apr. 27, 2006

(51) Int. Cl.
*G06Q 40/00* (2006.01)
(52) U.S. Cl. .............................. 705/35; 705/36; 705/37; 705/38; 705/39; 705/40; 705/41; 705/42; 705/43; 705/44; 705/45
(58) Field of Classification Search .............. 705/35–45
See application file for complete search history.

(56) References Cited

U.S. PATENT DOCUMENTS

| 5,675,746 | A | * | 10/1997 | Marshall | ....................... | 705/35 |
| 5,774,878 | A | | 6/1998 | Marshall | | |
| 6,073,115 | A | | 6/2000 | Marshall | | |
| 6,191,799 | B1 | | 2/2001 | Purdy | | |

(Continued)

FOREIGN PATENT DOCUMENTS

WO    WO2005035061    *    4/2005

OTHER PUBLICATIONS

)Hopper, D.G.; Haralson, D.G.; Simpson, M.A.; Longo, S.J. Review of Ultra-resolution (10-100 Megapixel) Visualization Systems Built by Tiling Commercial Display Components. Proceedings of the SPIE—The International Society for Optical Engineering, vol. 4712, pp. 282-299 © 2002.*

(Continued)

*Primary Examiner*—Harish T Dass
*Assistant Examiner*—Robert R Niquette
(74) *Attorney, Agent, or Firm*—Sheppard Mullin Richter & Hampton LLP

(57) ABSTRACT

A system for visualizing financial data of an organization comprises a database for storing and processing the financial data, a dynamic rules based engine, a graphical interface for depicting the financial data as instruments that are part of an instrument panel within a vehicle, such as an airplane, and a software program residing on the database. The software program comprises machine readable or interpretable instructions for converting the financial data into graphics representing the instrument panel. The database preferably has links established with financial and/or measurement formulas, wherein each financial formula is linked with one or more instruments on the instrument panel. The database also has links established with the financial data such that as new financial data is entered into the database, the instruments automatically change to reflect the new data, thereby altering a path of the vehicle. Additionally, the vehicle may be dragged along a desired flight path on the graphical interface such that a user may observe the changes in the financial data that are required to achieve the desired flight path. Assumptions may be changed and variance reports are generated to detail the differences. Steps necessary to navigate the vehicle into a desired position may be calculated.

33 Claims, 6 Drawing Sheets

U.S. PATENT DOCUMENTS 6,622,124 B1 9/2003 Kolls
2002/0065703 A1* 5/2002 Garg .............................. 705/9
2002/0130868 A1 9/2002 Smith
2002/0158583 A1 10/2002 Lys et al.
2003/0110249 A1* 6/2003 Buus et al. .................. 709/224
2003/0158801 A1* 8/2003 Chuah ........................ 705/36

OTHER PUBLICATIONS http://www.netledger.com/portal/home.jsp; Sep. 9, 2003; p. 1 of 1.
Vital Assets; www.vitalassets.com.

* cited by examiner

Formulas

| Aeronautical Term | Financial Team | Formula |
| --- | --- | --- |
| Heading | SG&A | Revenue / Total Operating Expenses |
| Altitude | Gross Margin | (Revenue-COGS) / COGS |
| Fuel | Cash | Cash & Cash Equivalents |
| Temperature | Competition | RMA Figures |
| Up | Inventory | Inventory / Average Turnover Days |
| Down | CAPEX | CAPEX Required in Next 24 Months |
| Startboard | AP | Average Days Outstanding > 30 |
| Port | AR | Average Days Outstanding > 30 |
| Speed | Sales Growth | Change Over Previous Months |
| Air Pressure | Exec Pay | Exec Pay / Total Operating Expenses |
| Burn Rate | Weight | Monthly Net Cash Outflow |
| Forecast | Visability | Completed |
| Budget | Weather | Completed |

FIG. 6

SYSTEM FOR VISUALIZING FINANCIAL DATA

FIELD OF THE INVENTION

The present invention generally relates to a system for visualizing financial data of an organization that provides a comprehensive financial platform and the power to visualize a multi-dimensional, interactive, real-time picture of the organization.

BACKGROUND OF THE INVENTION

Over the past twenty years, many software companies have developed and marketed financial and accounting software. The functionality, prices and target markets of these packages has varied significantly. One commonality of these financial packages is a lack of multi-dimensional financial reporting and in particular the analysis designed to provide meaningful insight to the business owner or manager to manage the business.

The reporting of financial information in an organization typically takes two forms, namely: (1) reports containing figures (single dimensional); and (2) graphic depictions of these figures (dual dimensional). Both forms usually represent a one or two dimensional, static and historical view of one particular segment of the overall finances of the organization. Some combination of reports and graphs allow the reader to obtain a more comprehensive view of the overall financial health of the organization. Most often, these financial reports are only provided on a periodic basis (e.g., monthly or quarterly), thereby forcing the reader to only be reactive as opposed to proactive because they become aware of events after the fact. In some cases it is months after the event and too late to react or recover.

In most organizations, the management team includes a Chief Executive Officer (CEO) (often the majority owner), a Chief Financial Officer (CFO) and/or a Controller. However, management teams frequently lack a Certified Public Accountant (CPA) and often have limited knowledge of finance, accounting, cash flow, and/or have limited experience simultaneously managing all financial measures central to the health of the organization. In particular, the knowledge level of technology and the ability to leverage this knowledge to improve financial processes and useful output (i.e., reporting) vary significantly. This is especially true of small and medium sized organizations where smaller time period reviews are critical.

Accordingly, there exists a need for a system for visualizing financial data of an organization that provides a comprehensive financial platform and the power to visualize a multi-dimensional picture of the organization, thereby, allowing the management team to observe changes as they occur and, thereby, monitor all of the most important financial and operational measures in their organization simultaneously in real-time so they can proactively take corrective action.

SUMMARY OF THE INVENTION

The system of the present invention provides a comprehensive financial platform adapted to navigate an organization to profitability and increased efficiency. In a preferred implementation of the invention, the system includes an interactive graphical interface to display financial information contained in accounting or financial software databases, though this could be expanded to include any database containing data which the management of an organization would like to monitor on a continuous basis. The financial information is displayed as part of a vehicle instrument panel including instruments used to monitor the progress of the vehicle's path and compare the actual vehicle path to a desired or planned vehicle path. The instrument panel preferably provides a management team with an overall view of the financial health of the organization and may act as a catalyst for action by the management team prior to reviewing, receiving, or requesting traditional periodic financial figures or reports.

According to a preferred embodiment, the vehicle may be dragged and dropped at a desired position on the screen (e.g., using conventional drag and drop technology that is per se known in the art), thereby changing the values displayed by the instruments and documenting the potential impact on the underlying business. Advantageously, this allows a user to observe the change in values displayed on the instruments that are required for the vehicle to achieve the desired movement. The vehicle may be dragged and dropped using conventional means such as a mouse, joystick, voice control or other device. Additionally, a user may establish more than one path for the vehicle. For example, it may be desirable to establish an actual path, a budget path and a forecast path. The differences between the actual, budget and forecast paths preferably are calculated and then reported to the user. According to some embodiments, suggested steps are then provided to the user in order to influence their vehicle to follow one of the user target defined paths.

An aspect of the invention involves a system for visualizing financial data of an organization, the system comprising a database for storing and processing the financial data, a graphical interface for depicting the financial data as instruments that are part of an instrument panel within a vehicle and a software program residing on the database. The software program comprises machine readable or interpretable instructions for converting the financial data into graphics representing the instrument panel. The database preferably has links established with financial formulas, wherein each financial formula is linked with one or more instruments on the instrument panel. The database also has links established with the financial data such that as new financial data is entered into the database, the instruments automatically change to reflect the new data, thereby altering a path of the vehicle. Additionally, the vehicle may be dragged along a desired flight path on the graphical interface such that a user may observe the changes in the financial data that are required to achieve the desired flight path, thereby allowing the user to create and save different scenarios.

According to some embodiments of the invention, the instrument panel is part of a virtual cockpit within a virtual airplane and the instruments comprise gauges, dials or lights. The instrument panel may also include one or more alarms configured to alert the management team when the positioning of one of the instruments changes by a predetermined amount. According to other embodiments, the instrument panel is part of a virtual dashboard or virtual cockpit within a virtual boat, virtual truck, virtual bus, virtual space shuttle, or virtual motorcycle or other virtual vehicle. Vehicles may be configured for different industries. The graphical interface may be part of a personal computer, laptop, personal digital assistant, mobile device or mobile phone.

In a preferred implementation, the software program further comprises a simulator that is used to establish an actual path, a budget path and a forecast path for the organization. The simulator relies on historical data within the database to calculate the actual flight path, relies on forecast data to calculate the projected flight path and relies on budget data to calculate the planned or budget flight path. Differences between the actual flight path, projected forecast flight path and budget flight path are calculated, and then displayed in one or more variance reports. Additionally, trends are determined and other analysis tools may be used to calculate and recommend corrective measures or the necessary steps to get bring the plane into a certain position.

A further aspect of the present invention involves a system for visualizing financial data of an organization, the system comprising a database for storing and processing the financial data, a graphical interface for depicting the financial data as a simulated vehicle and a software program residing on the database. The software program preferably comprises machine readable or interpretable instructions for converting the financial data into graphics representing one or more simulated vehicle paths, wherein changes in the financial data effect changes in the simulated vehicle path. The database has links established with the financial data such that as new financial data is entered into the database, the simulated path of the vehicle is altered. Additionally, the vehicle may be dragged along a desired flight path on the graphical interface such that a user may observe the changes in the financial data that are required to achieve the desired flight path. The user may also be allowed to choose the source of the information and change the database or select certain fields within the current database, for example choosing between cash and accrual figures or changing the time periods.

According to an additional aspect of the invention, a user may have interactive contact with the environment surrounding the chosen vehicle. For example, the user may need to get clearance for takeoff from the air traffic controller when beginning a scenario or may require clearance to land before ending. Another example centers around having completed the budget for the organization. If the budget has been completed, the pilot sees clear, blue skies. If the budget has not been completed, the pilot sees gray, cloudy skies. Additionally, the user may view multiple planes on the screen, wherein each plane represents a division, department or project within an organization. Organization personnel can be assigned workflow responsibilities. For example, the CEO is the Pilot, CFO is Co-pilot, and the Board of Directors the Air Traffic Controller where each has certain tasks assigned. Progress on completion of the tasks influences how the vehicle progresses in a given scenario. According to further embodiments of the invention, the financial data is risk weighted so that changes in financial data have varying degrees of effect on the overall performance of the vehicle. Additionally, an overall value may be calculated representing the current status of the organization as a whole (for example, a measure of the overall valuation of the organization, a division or a particular project). The vehicle may be configured to change color based upon the overall value.

BRIEF DESCRIPTION OF THE DRAWINGS

FIG. 6 is a listing of standard financial terms and formulas for calculating the financial terms, as well as suggested aeronautical terms corresponding to the financial terms;

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention provides a comprehensive system that encompasses each relevant phase of the financial development and life of an organization, from planning to accounting to measurement to adjustment. The financial information preferably is displayed as part of a vehicle instrument panel including instruments used to monitor the progress of the vehicle and compare the actual vehicle path to a desired or planned vehicle path. This is achieved by graphically depicting information in the form of multiple instruments in real time and allowing user interaction for simulation and correction.

Figure 1:
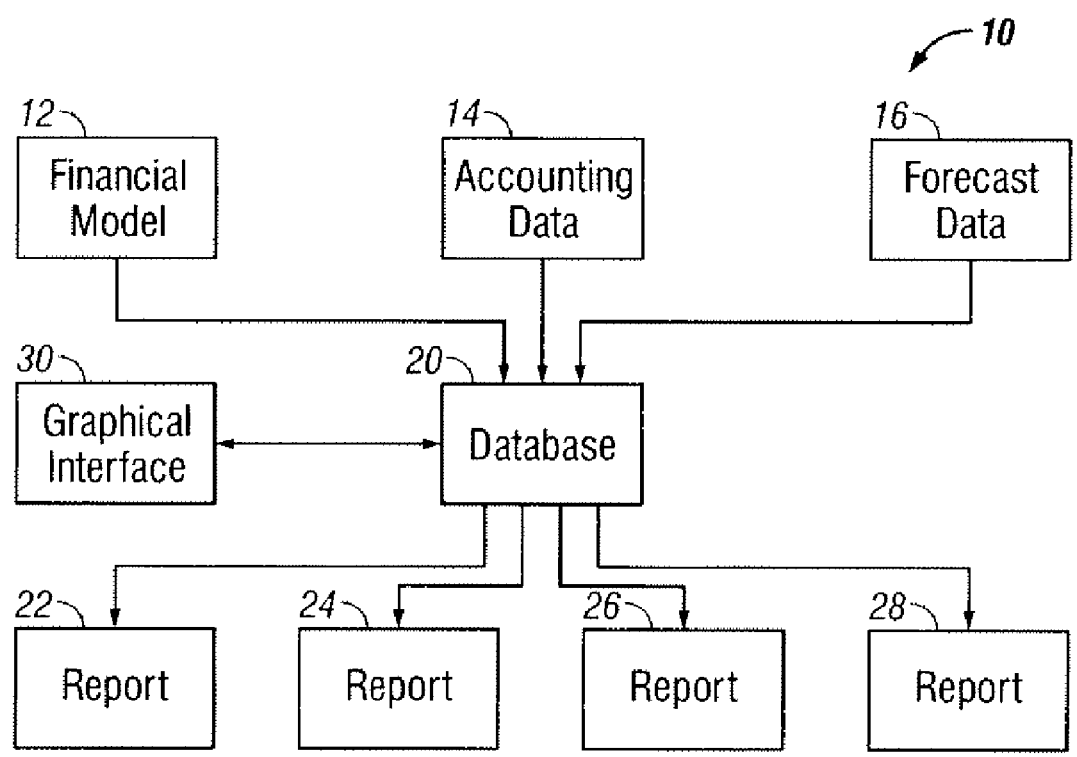
FIG. 1 is a flowchart of a system for visualizing financial data in accordance with the principles of the present invention.

Referring to FIG. 1, in a system 10 for visualizing financial data, information including financial model 12, accounting data 14 and forecast data 16 are input into database 20, which converts these multi-dimensional inputs into a plurality of one-dimensional reports 22, 24, 26, 28. Reports 22, 24, 26, 28 may comprise profit/loss reports, cash flow reports, project reports, ratios/key figure reports or any other applicable reports. System 10 preferably further comprises graphical interface 30 for displaying financial information in the form of a virtual vehicle instrument panel including instruments used to monitor the progress of the vehicle's path. Graphical interface 30 may also be used by management to establish an actual path, a budget path and a forecast path, as well as to display one or more reports 22, 24, 26, 28.

A software program comprising machine readable or interpretable instructions for converting the financial data inputs into graphics and reports preferably resides on database 20 and graphical interface 30. The software program relies on information received from database 20, which preferably has links established with financial formulas, wherein each financial formula is linked with an instrument on the instrument panel such that as the underlying financial information changes, the instruments move accordingly and the vehicle changes position. The software program further allows calculations to be made that provide guidance with respect to which accounts should be collected, how much should be collected and any other combination of account interdependencies in accordance with USA, international and customized generally accepted accounting principles and financial measures. To enhance the results, the data may be analyzed to allow trends to influence this resulting guidance.

Figure 2:
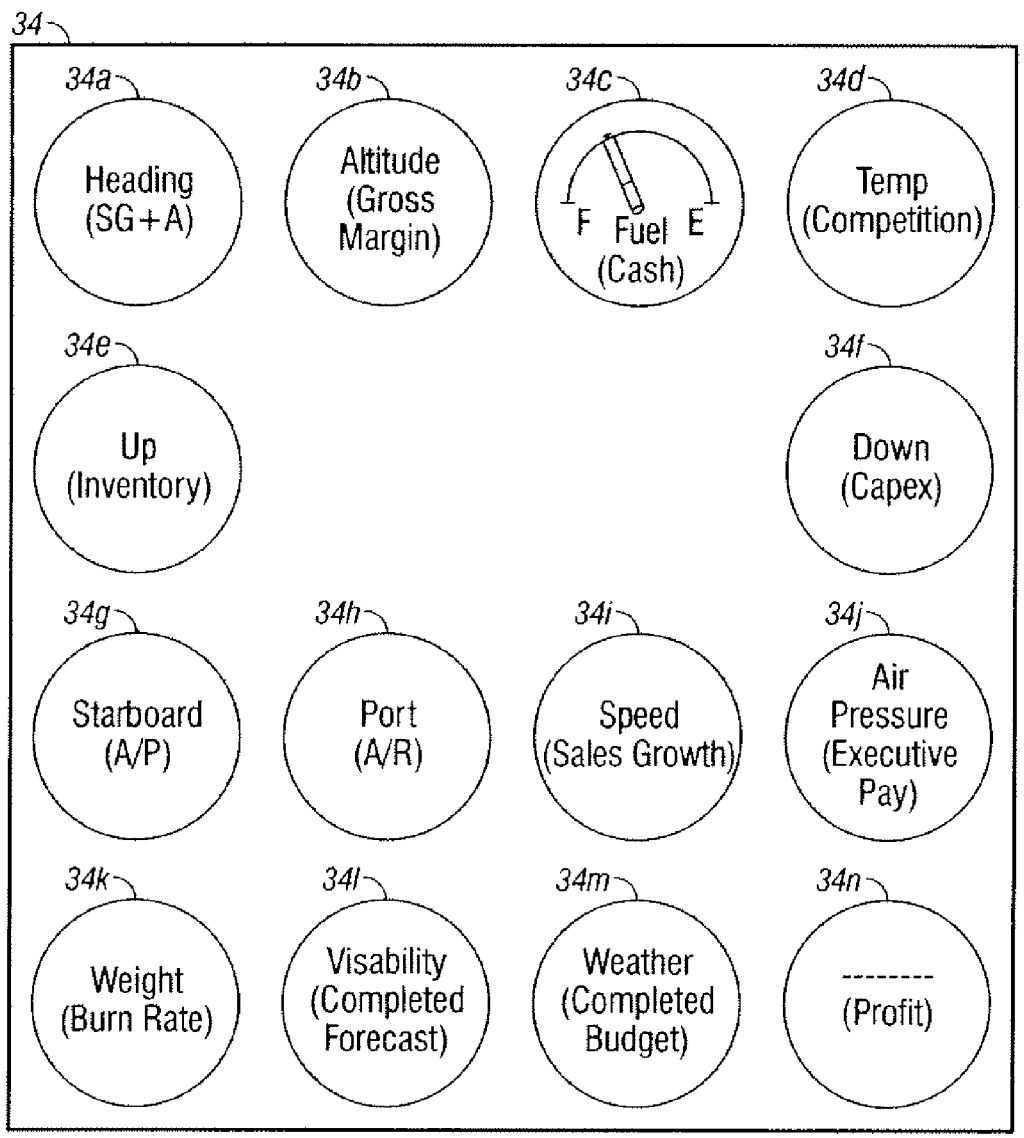
FIG. 2 is a front view of an instrument panel comprising a plurality of instruments employed to monitor the progress of a vehicle in accordance with the principles of the present invention.
Figure 3:
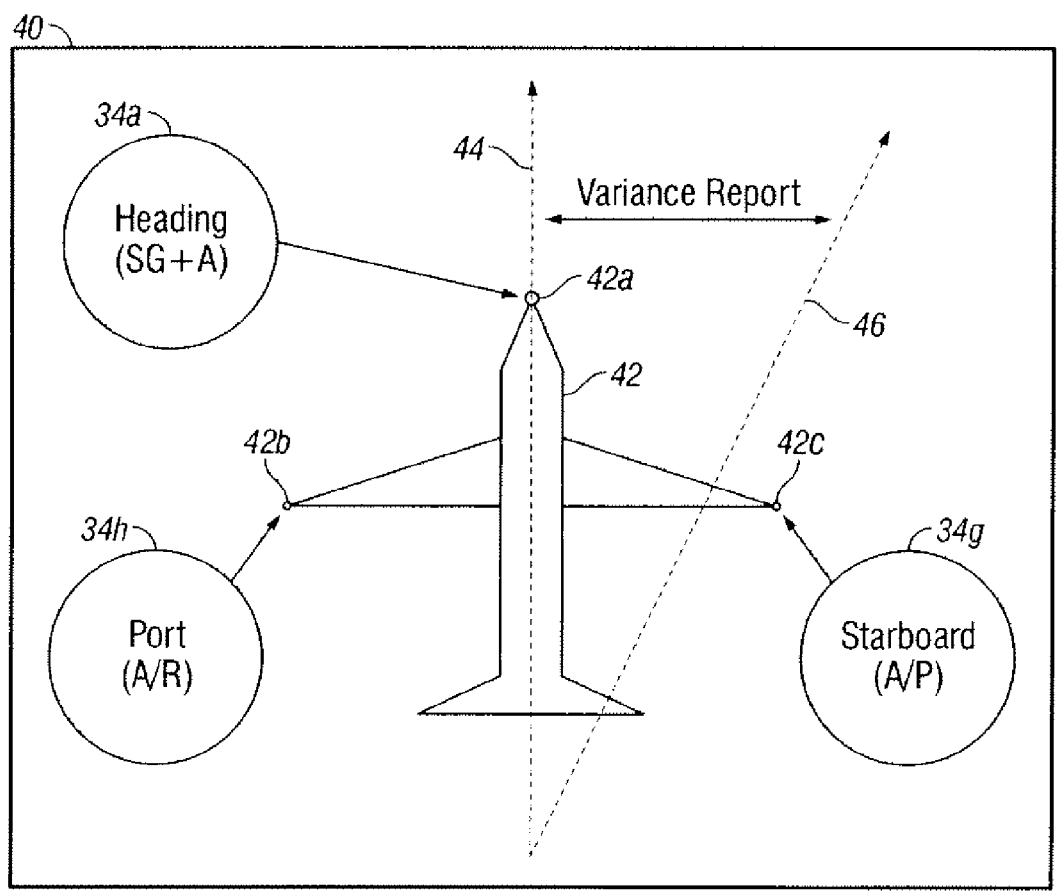
FIG. 3 is a front view of a vehicle simulator for monitoring the progress of the vehicle in accordance with the principles of the present invention.
Figure 4:
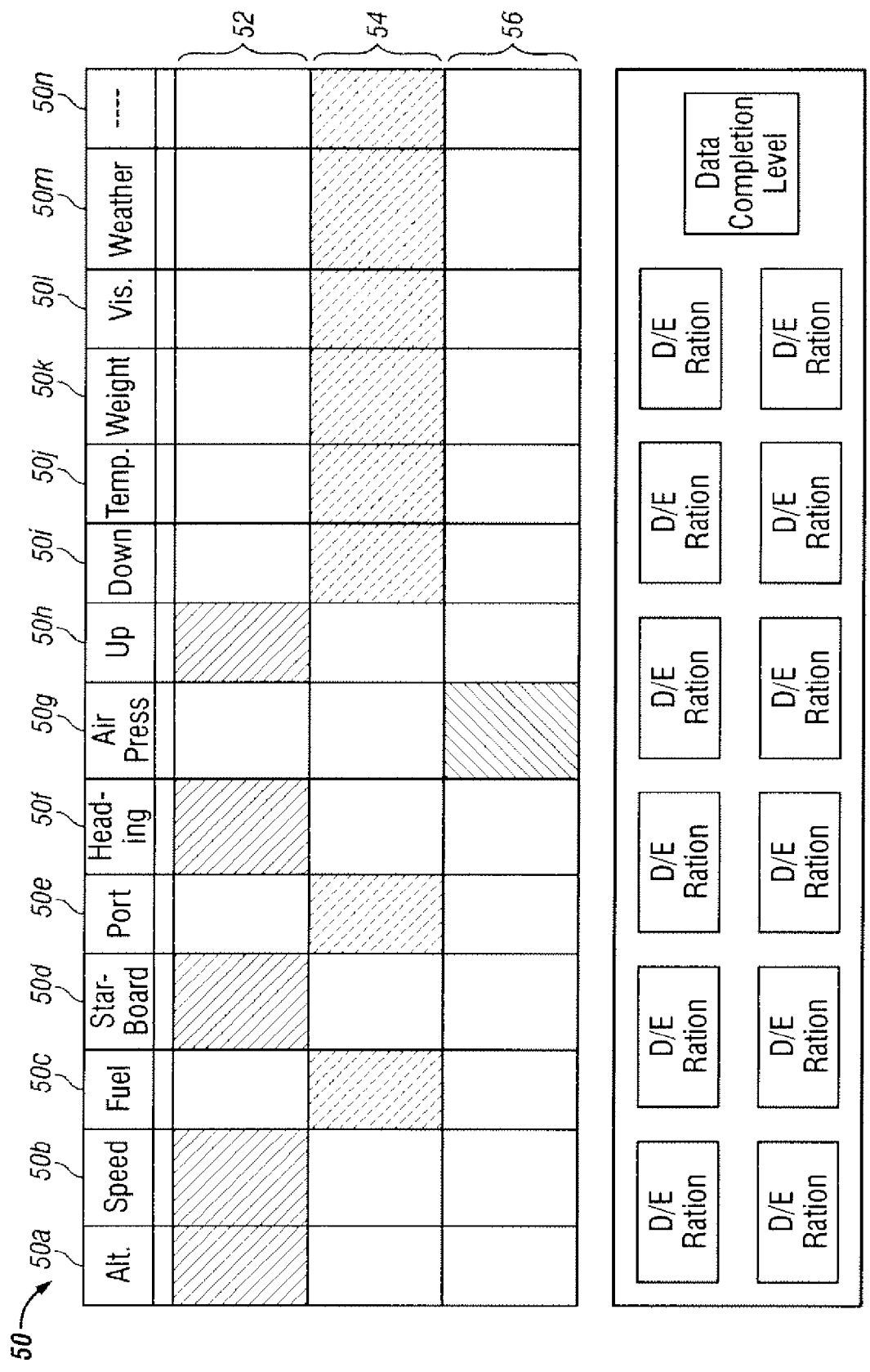
FIG. 4 is a front view of an additional instrument panel for monitoring the progress of the vehicle in accordance with the principles of the present invention.

Referring to FIGS. 2-4, the graphical interface comprises one or more interactive screens for displaying pertinent financial information contained in the database. The interactive screens preferably may be viewed side-by-side within the virtual cockpit. The instruments and the vehicle preferably are viewable on a personal computer or other suitable device, for example using a web browser as a portlet in a portal. Alternatively, a mobile or wireless device such as a laptop, personal digital assistant (PDA) or mobile telephone may be employed to wirelessly access the web browser. In the illustrated embodiment, the vehicle is an airplane and the interactive screens are disposed within a virtual cockpit within the airplane. As would be understood by one of ordinary skill in the art, the vehicle may be a boat, car, truck, bus, space shuttle, motorcycle, or other vehicle without departing from the scope of the present invention. The user preferably may choose which vehicle they prefer to use to monitor and navigate their business. The user may also choose to view multiple vehicles simultaneously representing differing scenarios, departments, divisions or subsidiaries.

Referring to FIG. 2, a first interactive screen within the virtual cockpit comprises instrument panel 34. In accordance with an aspect of the invention, instrument panel 34 comprises a plurality of instruments 34a-34n that are employed to monitor the progress of the vehicle and compare an actual vehicle path to a desired or planned vehicle path. By rendering financial measures as instruments in a vehicle, the instruments may be used to visualize how the vehicle (and organization) is progressing along a desired path. The instruments may be represented by gauges, dials, lights and/or other controls. For example, instrument 34c may be used to represent fuel (cash) and the instrument may comprise a standard automotive fuel gauge as depicted in FIG. 2.

In general, the instruments represent the characteristics of how the vehicle is operating. More particularly, instruments 34a-34n in the airplane cockpit represent how the airplane is flying and how the organization is running as compared to other scenarios. In the illustrated embodiment, instrument 34a represents "heading", which corresponds to selling, general and administrative expenses (SG&A) and instrument 34b represents "altitude", which corresponds to gross margin. The rest of the instruments each include an aeronautical term and a corresponding financial term in parentheses. Instrument 34n represents profit, but does not yet include a corresponding aeronautical term but may be associated with an aeronautical term or the environment in which the vehicle normally operates. The user is also able to change the position of the dials, the measure associated with the dial, the aeronautical equivalent associated with a dial and the source of the data.

The system of the present invention may be employed to visualize the financial outlook of an organization. In viewing the organization the CEO can be looked at as the pilot of the airplane, the CFO as the co-pilot, the controller/bookkeeper as the head flight attendant and the accountants as the flight attendants. Prior to take-off, the pilots may check the weather (budget), visibility (forecast) and other variables rendered as instruments. After take-off, the pilots may check the speed (sales growth), altitude (gross margin) and other variables. Furthermore, certain conditions may be required before clearance for takeoff is permitted by the air traffic controller. There is also an auto pilot feature to allow for maintaining the current course using cash flow and financial management methodologies.

Referring to FIG. 3, a second interactive screen within the virtual cockpit comprises flight simulator 40. In accordance with another aspect of the invention, flight simulator 40 is a graphical representation depicting airplane 42, as well as a projected flight path 44 and an actual flight path 46. Historical data may be used to calculate actual flight path 46, whereas forecast data may be used to calculate a projected flight path (not shown) and budget data may be used to calculate a budget flight path 44.

Differences between the actual flight path, projected flight path and budget flight path preferably are calculated and available in one or more variance reports. For example, it may be desirable to establish an actual path, a budget path and a forecast path. According to some embodiments, the software of the invention provides suggested steps to the user in order to influence their vehicle to follow one of the user defined paths. A management user preferably has the option to communicate and collaborate with other employees by assigning tasks and then sending the task, any notes and the report in an email. According to other embodiments, the graphical interface further comprises one or more alarms configured to alert the user when the vehicle strays from its projected path by a predetermined amount.

According to a further aspect of the present invention, predetermined sections 42a, 42b, 42c of airplane 42 may be selected by the user (e.g., by double-clicking) to bring up various instruments on the flight simulator screen. In the illustrated embodiment, the heading (SG&A) instrument 34a pops up when section 42a is selected. Similarly, the port (A/R) instrument 34a pops up when section 42a is selected and the starboard (A/P) instrument 34a pops up when section 42a is selected. Then the user may view the underlying report and can drill down further into the database to view subreports and then the individual transactions making up the balances. Attached to the actual transactions may be uploaded images of the supporting documentation (eg, the invoice). For the budget transactions, the assumptions underlying the figures are documented and available for viewing or editing (both figures and text).

With further reference to FIG. 3, as new financial data is entered into the database, the instruments automatically change to reflect the new data, thereby altering the airplane's flight path. Changes in the flight path preferably are monitored and a variance report is generated reflecting the changes. In addition, the airplane may be dragged along projected flight path 44 to observe how the instruments 34a-34n on instrument panel 34 changes over time. In other words, as airplane 42 is dragged along projected path 44, the instrument values automatically change, thereby providing important information as to which values must change to reach organizational goals. This may be accomplished using conventional drag and drop technology that is per se known in the art. Conversely, the dials my be moved to observe the change in position of the vehicle.

Many of the formulas underlying the instruments are interrelated such that correlations between instruments may be visualized when dragging the airplane. For example, using historical trends and generally accepted accounting theory, an increase in sales growth corresponds with an increase in A/R. Likewise, a decrease in gross margin results in a decrease in cash, whereas a decrease in executive pay results in an increase in cash. According to a further aspect of the invention, airplane 42 may be dragged and dropped at a desired position on flight simulator screen 40, thereby changing the values displayed by instruments 34a-34n on instrument panel screen 34. Advantageously, this allows a user to observe the change in values displayed on the instruments that are required for the airplane to achieve the desired movement.

Referring to FIG. 4, a further instrument panel 50 is provided as an alternative to, or in addition to, instrument panel 34. Instrument panel 50 comprises a plurality of aeronautical headings 50a-50n along the horizontal axis, and a plurality of alerts in the form of lights 52, 54, 56 along the vertical axis, wherein lights 52 comprise a row of green lights, lights 54 comprise a row of yellow lights and lights 56 comprise a row of red lights. As would be understood to one of ordinary skill in the art, many alternative visual and/or audio alerts may be employed without departing from the scope of the present invention.

Each aeronautical term preferably is provided with a range of preferred values and a range of acceptable values. These values may be default values or user defined. So long as the actual value of an aeronautical term is within this acceptable range, the corresponding green (or other user defined color or shade) light is turned on. When the actual value is between the preferred range and the acceptable range, the corresponding yellow (or other user defined color or shade) light is turned on, and when the actual value is below the acceptable range, the red (or other user defined color or shade) light is turned on. In the illustrated embodiment, altitude, speed, starboard, heading and up are within preferred ranges, whereas air pressure is not within an acceptable range. The remaining aeronautical values are within acceptable ranges, but not within preferred ranges.

Figure 5:
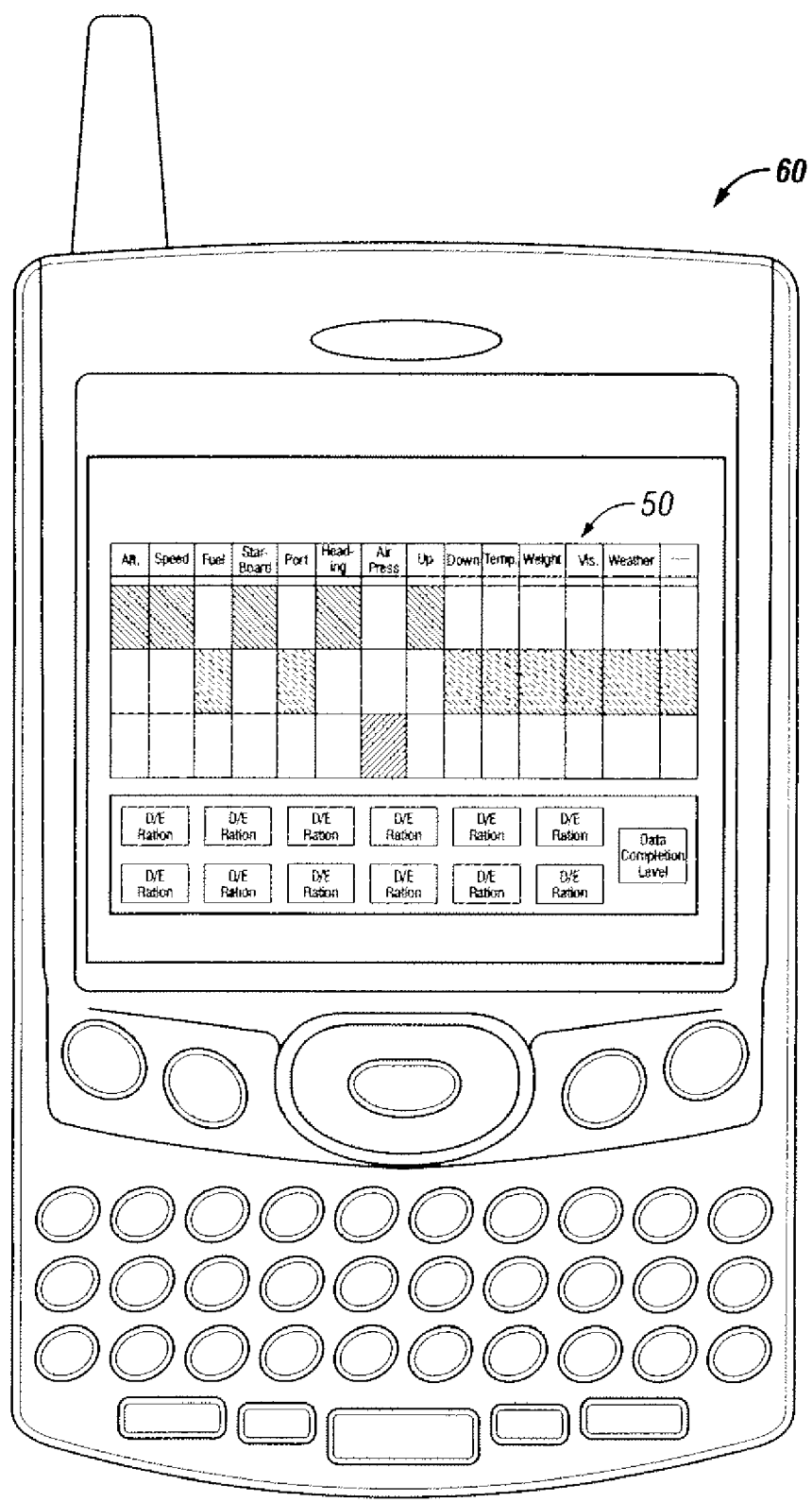
FIG. 5 is a front view of a personal digital assistant (PDA) configured to run the software program of the present invention.

Referring to FIG. 5, the software of the present invention is provided on a conventional personal digital assistant (PDA) 60 (or mobile phone) such that a user may wirelessly access the web browser. PDA 60 is handheld device, per se known in the art, that functions as a cellular phone, fax sender, Web browser and personal organizer. In the illustrated embodiment, instrument panel 50 is shown on the display screen of the PDA. Advantageously, PDA 60 provides real time access to financial information from a remote location. As would be understood by those of ordinary skill in the art, many other wired and wireless devices may be employed to display the financial information without departing from the scope of the present invention. Conversely, wireless alerts can be sent to indicate changes (eg, light turns red) as defined by the user.

According to an additional aspect of the invention, users are provided with a list of standard financial measures (e.g., ratios, formulas or algorithms). Furthermore, users may define additional financial measures that they deem vital to monitoring the financial health of their organization. Many financial measures are standard, defined and well known in financial and accounting fields (e.g., accounts payable (A/P)), whereas other financial measures are internally developed to measure industry-specific and/or company-specific performance goals. In either case, an organization's financial measures are typically highly interrelated and codependent.

With respect to accounting transactions, at least two accounts are affected by a single transaction. With respect to other transactions, more than two accounts are affected by each transaction. Using computer technology, the transactional information may be viewed on a two dimensional level (using x and y coordinates), or on a three dimensional level (using x, y and z coordinates). As discussed above, the relationships and interdependencies between the financial measures are linked using the database. Once the appropriate links have been established, simulation is possible on both historical and future forecast bases. Additionally, the user may save different simulation scenarios for future reference or comparison with other generated scenarios. Difference reports can, therefore, be generated and recommended steps put forth to bring the two scenarios in line with one another.

The software of the present invention preferably allows calculations to be made that provide guidance with respect to which accounts should be collected and how much money should be collected. For example, by collecting the listed A/R accounts and reducing executive pay by a predetermined percentage, how much will the cash balance of the organization increase? The software of the present invention can be programmed to provide such answers and can even prioritize them. User defined preferences may influence the recommended steps and the assigned priorities.

Referring to FIG. 6, an additional interactive screen comprises a listing 70 of standard financial terms, formulas and algorithms for calculating the financial terms. The listing further provides some suggested aeronautical terms to define each instrument. The aeronautical terms may be chosen to best represent the underlying financial term. The user is permitted to define preferences for each individual or measurable instrument which will allow the user to measure or be alerted to standard deviation or variances that align with best business practices for their industry. For example, the aeronautical term "fuel" may be selected to represent the financial term "cash", since each term represents a resource that must be used up or burned to achieve goals. A healthy ratio of cash measured against other assets, for example, may vary by industry. The user preferably may choose which output will be associated with which gauge.

The aeronautical term "heading" may be chosen to represent SG&A, which may be calculated by dividing revenue by total operating expenses. The aeronautical term "altitude" may be chosen to represent gross margin, which may be calculated by subtracting the cost of goods sold (COGS) from revenue and then dividing by COGS. The aeronautical term "fuel" may be chosen to represent cash, which may be calculated as the sum of cash and cash equivalents. The aeronautical term "cabin temperature" may be chosen to represent competition, which may be calculated using RMA figures. The aeronautical term "up" may be chosen to represent inventory, which may be calculated by diving inventory into average turnover days.

The aeronautical term "down" may be chosen to represent capital expenditures (CAPEX), which may be calculated by totaling CAPEX required in the next 24 months or that which was required to be expended. The aeronautical term "starboard" may be chosen to represent accounts payable (A/P), which may be calculated by summing all A/P that has been outstanding for over 30 days. The aeronautical term "port" may be chosen to represent accounts receivable (A/R), which may be calculated by summing all A/R that has been outstanding for over 30 days. The aeronautical term "speed" may be chosen to represent sales growth, which may be calculated as the change in total sales over the previous months.

Still referring to FIG. 6, the aeronautical term "air pressure" may be chosen to represent executive pay, which may be calculated by dividing executive pay by total operating expenses. The aeronautical term "weight" may be chosen to represent burn rate, which may be calculated by summing the monthly net cash outflow. The aeronautical term "visibility" may be chosen to represent the completed forecast, whereas the aeronautical term "weather" may be chosen to represent the completed budget. Additional financial terms that may be represented as aeronautical terms include, but are not limited to, average sales per day, average cost of good sold per day, average other expenses per day, days' sales in inventory, days' sales in receivables, sales bookings, sales pipeline and sales cancellations. As would be appreciated by those of ordinary skill in the art, the listed aeronautical terms are for illustrative purposes only and many additional financial terms may be employed without departing from the scope of the present invention. Such additional financial terms may be industry-specific and/or company-specific.

A method of associating aeronautical terms with financial terms using the software of the present invention will now be described. As described hereinabove, FIG. 6 depicts a plurality of commonly-used financial terms, formulas for computing the financial terms, as well as corresponding aeronautical terms. Initially, a user selects a financial term, for example by clicking or double-clicking on a chosen financial term or value of measurement (collectively, "financial term"). Alternatively the user may define an industry-specific financial term that they consider vital to the financial health of their organization.

The next step involves associating the financial formula and term with a chosen instrument, for example using conventional drag and drop technology. The next step involves establishing links between the database and the financial formulas such that the financial formulas are automatically updated when the database information is updated. The next steps involve linking the financial formulas to the instruments such that the instruments reflect changes in the underlying financial information and linking the instruments to the movement of the vehicle. After the appropriate links have been established, the vehicle may be dragged across the screen in a desired path such that the instruments reflect the goals needed to achieve the desired path.

The present invention provides a financial management platform that encompasses: (1) financial modeling (budget); (2) accounting (actuals); (3) updating the budget (forecast); (4) management reporting (budget vs. actuals, burn rate, cash flow by project, etc.); and (5) other features (e.g., valuation, wireless updates, etc.). Although these financial management platform components can be broken off and used independently, they preferably are used together to form a single comprehensive business navigation tool for managing resources against a strategic plan to generate cash flow.

According to a preferred implementation, the financial model of the present invention automatically assigns numbers (i.e., to projects, vendors, customers, employees, etc.). By way of example, "budget" numbers may include a "1" as the first digit, "actual" numbers may include a "2" as the first digit, and "forecast" numbers may include a "3" as the first digit. The financial model preferably features expanded data entry including data entry exception reports that indicate which fields are missing and the value of the transactions. The user may then view all three on the same screen or may choose which of these to view.

Unlike conventional databases, the database of the present invention preferably permits more than one A/P posting per journal entry. Database features the following modules: (1) management reporting; (2) lender reporting; (3) investor reporting; (4) shareholder reporting; (5) valuation estimates; and (6) sample agreements. The management reporting module features return on investment (ROI) by resources applied (e.g., product, department), a text explanation of variances required (e.g., +/-10%), a review of last month's goals and current month's activities. Further features of management reporting may include: (1) allocation of individual expenses; (2) enhanced budgeting and forecasting; (3) limited reports; (4) fixed asset schedules; (4) depreciation schedules; (5) automated journal entries; (6) multi-currency entries; (7) subsidiary consolidation; (8) automatically generated annual reports; (9) scenario analyses; (10) optimal capital structures; (11) debt schedules; (12) investment schedules; (13) capital expenditures; and (14) capability maturity models.

The lender reporting module features specific information for lenders such as banks, small business association (SBA) lenders and other lenders. The lender-specific information may include debt-equity ratios, use of proceeds and other lender-specific information. The investor reporting module provides reports specifically for investors, such as including burn rate, time left, use of proceeds, mailing lists of investors, and estimated ROI. The shareholder reporting module preferably includes a template for a periodic shareholder letters. The valuation estimates module provides estimates of the value of an organization based upon actual, budget and/or forecast figures input by the user or resident in the database. The sample agreements module includes service agreements, product agreements, term sheets, investment agreements and convertible notes or other internal corporate or industry specific documents.

System users preferably may generate balance sheet reports including, but not limited to: (1) balance sheet standard reports; (2) balance sheet detail reports; (3) balance sheet summary reports; (4) balance sheet previous year comparison reports; and (5) net worth graphical reports. The balance sheet standard reports present the organization's balance sheet accounts as of a specified date. The balance sheet detail reports present the beginning balance for each balance sheet account as of the beginning of the specified time period, detail transactions posted during that time period, and the ending account balance at the end of the specified time period. The balance sheet summary reports summarize the standard balance sheet reports by presenting a total for each balance sheet account type (i.e., bank, accounts receivable, other current assets, etc.) rather than a total for each individual account. The balance sheet previous year comparison reports present a company's balance sheet as of a specified date and as of the same date one year earlier. The net worth graphical reports include a bar graph that summarizes total assets, total liabilities, and total net worth as of a specified date. Users preferably are able to zoom in on any bar in the bar graph to generate a pie chart that summarizes the information as of the selected date.

System users may further generate the following income statement reports including, but not limited to: (1) profit and loss standard reports; (2) profit and loss detail reports; (3) profit and loss year-to-date comparison reports; (4) profit and loss previous year comparison reports; and (5) income and expense graphical reports. The profit and loss standard reports summarize a company's income and expenses for a specified time period and reports net income for that period. The profit and loss detail reports present the transactions posted to each income and expense account during a specified time period. The profit and loss year-to-date comparison reports summarize the organization's income and expenses for a specified time period and for the fiscal year through the end of the specified time period. The profit and loss previous year comparison reports summarize the organization's income and expenses for a specified time period and for the same time period one year earlier. The income and expense graphical reports comprise a bar graph that summarizes income and expenses for a specified time period. These reports may further include a pie chart that breaks down total income for the period by account and a pie chart that breaks down total expenses for the period by account. Users preferably may zoom in on any bar in the bar graph to generate a pie chart that summarizes income and expense for the selected time period. Similarly, users can zoom in on any account in the pie charts to generate a graph for the specified time period.

In addition to the income statement reports, users also can generate the following reports: (1) profit and loss by job reports; (2) profit and loss by class reports; (3) income by customer summary reports; (4) income by customer detail reports; (5) expenses by vendor summary reports; and (6) expenses by vendor detail reports. Users may further generate statement of cash flow reports and cash flow forecast reports. The statement of cash flow reports present changes in the user's cash during a specified time period and shows cash received and cash paid for operating, investing, and financing activities.

In accordance with the principles of the present invention, budget reports that may be generated include, but are not limited to: (1) budget overview reports; (2) budget vs. actual reports; (3) profit and loss budget performance reports; and (4) budget vs. actual graphical reports. The budget overview reports show budget-only information, whereas the budget vs. actual reports show (for each month) the actual and budget amounts, as well as dollar and percentage differences between the actual and budget amounts. The profit and loss budget performance reports show the current month actual and budget amounts and the year-to-date actual and budget amounts. The budget vs. actual graphical reports display income statement budget versus actual amounts in graphical from.

In accordance with the principles of the present invention, budget reports that may be generated include, but are not limited to: (1) forecast overview reports; and (2) forecast vs. actual reports. The forecast overview reports show forecast amounts by month, whereas forecast vs. actual reports show (for each month) the actual and forecast amounts, as well as dollar and percentage differences between the actual and forecast amounts.

System users may generate the following additional financial reports: (1) trial balance reports; (2) general ledger reports; (3) transaction detail by account reports; (4) journal reports; (5) transaction list by date reports; (6) last month to previous month reports; (7) last quarter to previous quarter reports; (8) last year to previous year reports compare; (9) last month to same month a year ago reports; and (10) last quarter to same quarter a year ago reports. The trial balance reports present the balance in each account as of a specified date, with separate columns for accounts with debit balances and those with credit balances. The general ledger reports present the beginning balance, account activity, and the ending balance for each account for a specified time period. Transaction detail by account reports present the activity in each account, as well as a subtotal of activity for each account, for a specified time period. Journal reports list each transaction that occurred during a specified time period, with separate line items for each affected account and separate columns for debit and credit amounts. Transaction list by date reports chronologically list each transaction that occurred during a specified time period, with only one line item and one total amount listed for each transaction.

Last month to previous month reports compare the organization's balance sheet or income statement for the last two months, whereas last quarter to previous quarter reports compare the balance sheet or income statement for the last two quarters, and last year to previous year reports compare the balance sheet or income statement for the last two years. Last month to same month a year ago reports compare the organization's balance sheet or income statement for the last month and the same month from the previous year, whereas last quarter to same quarter a year ago reports compare the balance sheet or income statement for the last quarter and the same quarter from the previous year.

Thus, it is seen that system for visualizing financial data is provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. It is noted that various equivalents for the particular embodiments discussed in this description may practice the invention as well.

What is claimed is:

1. An apparatus for visualizing financial and measurement data of an organization comprising:
   a database for storing and processing the financial data;
   a computer including a processor for accessing and processing the financial data and interfacing with the database;
   an input device;
   a graphical interface linked to the computer for depicting the financial data as instruments that are part of an instrument panel within a vehicle; a display; and a software program residing on the database and interfacing with the computer, the database, the display, and the input device; and
   wherein the software program comprises machine readable or interpretable instructions for converting the financial data into graphics representing the instrument panel;
   wherein the database has links established with financial formulas, wherein each financial formula is linked with one or more instruments on the instrument panel;
   wherein the vehicle may be dragged along a desired future flight path on the display using the input device such that a user may observe the changes in the financial data as calculated by the financial formulas that are required to achieve desired future flight path, thereby allowing the user to create and save different scenarios;
   wherein an instrument may be altered via a mouse click to observe changes in a desired future flight path on the display such that the user may observe the changes as calculated by the financial formulas in the financial data that are required to achieve the desired future flight path;
   wherein the database has links established with the financial data such that as new financial data is entered into the database, the instruments automatically change to reflect the new data, thereby altering a path of the vehicle;
   wherein the software program further comprises a simulator that is used to establish an actual path, a budget path and a forecast path for the organization;
   wherein differences between the actual flight path projected flight path and budget flight path are calculated, and then displayed in one or more variance reports.

2. The apparatus of claim 1, wherein the instruments comprise gauges, dials or lights.

3. The apparatus of claim 1, wherein the instrument panel is part of a virtual cockpit within a virtual airplane.

4. The apparatus of claim 1, wherein the instrument panel is part of a virtual dashboard or virtual cockpit within a virtual boat, virtual truck, virtual bus, virtual space shuttle or virtual motorcycle.

5. The apparatus of claim 1, wherein the simulator relies on historical data within the database to calculate the actual flight path.

6. The apparatus of claim 1, wherein the simulator relies on forecast data to calculate the projected flight path.

7. The apparatus of claim 1, wherein the simulator relies on budget data to calculate the budget flight path.

8. The apparatus of claim 1 wherein the database converts multi-dimensional inputs into a plurality of one-dimensional reports.

9. The apparatus of claim 8, wherein the multi-dimensional inputs comprise a financial model, actual accounting data and forecast data.

10. The apparatus of claim 1, further comprising one or more alarms configured to alert the management team when the positioning of one of the instruments changes by a predetermined amount.

11. An apparatus for visualizing financial data of an organization, comprising:
    a database for storing and processing the financial data;
    a computer including a processor for accessing and processing the financial data and interfacing with the database; an input device;
    a graphical interface linked to the computer for depicting the financial data as a simulated vehicle;

a display; and a software program residing on the database and interfacing with the computer the database, the display, and the input device; and wherein the software program comprises machine readable or interpretable instructions for converting the financial data into graphics representing one or more simulated vehicle paths;

wherein changes in the financial data effect changes in the simulated vehicle path;

wherein the vehicle may be dragged along a desired future flight path on the display using the input device such that a user may observe the changes in the financial data as calculated by the financial formulas that are required to achieve the desired future flight path, thereby allowing the user to create and save different scenarios;

wherein an instrument may be altered via a mouse click to observe changes in a desired future flight path on the display such that the user may observe the changes as calculated by the financial formulas in the financial data that are required to achieve the desired future flight, path;

wherein the database has links established with the financial data such that as new financial data is entered into the database, the instruments automatically change to reflect the new data, thereby altering a path of the vehicle;

wherein the software program is used to establish an actual path, a budget path and a forecast path for the organization;

wherein differences between the actual flight path, projected flight path and budget flight path are calculated, and then displayed in one or more variance reports.

12. The apparatus of claim 11, wherein the simulated vehicle in an airplane.

13. The apparatus of claim 11, wherein the simulated vehicle is a boat, truck, bus, space shuttle, or motorcycle.

14. The apparatus of claim 11, wherein the software program relies on historical data within the database to calculate the actual flight path.

15. The apparatus of claim 11, wherein the software program relies on forecast data to calculate the projected flight path.

16. The apparatus of claim 11, wherein the software program relies on budget data to calculate the budget flight path.

17. The apparatus of claim 11, wherein the database converts multi-dimensional inputs into a plurality of one-dimensional reports.

18. The apparatus of claim 17, wherein the multi-dimensional inputs comprise a financial model, accounting data and forecast data.

19. The apparatus of claim 11, wherein the software program is adapted to recommend steps that the organization may undertake to alter the path of the vehicle to achieve a desired vehicle path.

20. The apparatus of claim 11, further comprising one or more alarms configured to alert a user when the vehicle strays from a projected vehicle path by a predetermined amount.

21. The apparatus of claim 11, wherein the financial data is risk weighted so that changes in financial data have varying degrees of effect on the overall performance of the vehicle.

22. The apparatus of claim 11, wherein an overall value is calculated representing the current status of the organization as a whole.

23. The apparatus of claim 22, wherein the vehicle is configured to change color based upon the overall value.

24. A method for visualizing financial and measurement data of an organization, comprising:
    converting financial data into graphics representing instruments that are part of an instrument panel within a vehicle;
    linking financial data with one ore more instruments on the instrument panel;
    displaying the instrument panel and the vehicle on a display;
    dragging the vehicle along a desired future flight path on the display; and
    observing changes in the financial data as calculated by the financial formulas that are required to achieve the desired flight path, thereby allowing the user to create and save different scenarios;
    wherein an instrument may be altered via a mouse click to observe changes in a desired future flight path on the display such that the user may observe the changes as calculated by the financial formulas in the financial data that are required to achieve the desired future flight path;
    wherein linking the financial data with one or more instruments on the instrument panel is such that as new financial data is processed, the instruments automatically change to reflect the new data, thereby altering a path of the vehicle;
    wherein the software program further comprises a simulator that is used to establish an actual path, a budget path and a forecast path for the organization;
    wherein differences between the actual flight path, projected flight path and budget flight path are calculated, and then displayed in one or more variance reports.

25. The method of claim 24, wherein the instruments comprise gauges, dials, or lights.

26. The method of claim 24, wherein the instrument panel is part of a virtual cockpit within a virtual airplane.

27. The method of claim 24, wherein the instrument panel is part of a virtual dashboard or virtual cockpit within a virtual boat, virtual truck, virtual bus, virtual space shuttle, or virtual motorcycle.

28. The method of claim 24, wherein the simulator relies on historical data within the database to calculate the actual flight path.

29. The method of claim 24, wherein the simulator relies on forecast data to calculate the projected flight path.

30. The method of claim 24, wherein the simulator relies on budget data to calculate the budget flight path.

31. The method of claim 24, wherein the database converts multi-dimensional inputs into a plurality of one-dimensional reports.

32. The method of claim 31, wherein the multi-dimensional inputs comprise a financial model, actual accounting data and forecast data.

33. The method of claim 24, further comprising one or more alarms configured to alert the management team when the positioning of one of the instruments changes by a predetermined amount.

* * * * *